United States Patent [19]

Wiesner et al.

[11] Patent Number: 4,715,636
[45] Date of Patent: Dec. 29, 1987

[54] GRIPPER INCLUDING AN EXCHANGEABLE GRIPPING JAW

[75] Inventors: Franz Wiesner, Owen/Teck; Horst Etzel, Hochdorf, both of Fed. Rep. of Germany

[73] Assignee: Traub AG, Fed. Rep. of Germany

[21] Appl. No.: 839,683

[22] Filed: Mar. 14, 1986

[30] Foreign Application Priority Data

Apr. 15, 1985 [DE] Fed. Rep. of Germany ....... 3513453

[51] Int. Cl.$^4$ ............................................. B25J 15/04
[52] U.S. Cl. .................................. 294/86.4; 414/729; 901/31
[58] Field of Search .................. 294/86.4, 88, 119.1, 294/902; 29/568; 269/279–281, 283, 284; 414/729, 730; 901/30, 31, 36, 39, 41, 50

[56] References Cited

U.S. PATENT DOCUMENTS

| | | | |
|---|---|---|---|
| 3,412,459 | 11/1968 | Hollis | 29/568 |
| 4,204,303 | 5/1980 | Eidam | 29/568 X |
| 4,512,709 | 4/1985 | Hennekes et al. | 294/86.4 X |
| 4,601,637 | 7/1986 | Aviles et al. | 901/39 X |
| 4,613,277 | 9/1986 | Guay | 294/902 X |

FOREIGN PATENT DOCUMENTS 3306510A  8/1984  Fed. Rep. of Germany .

OTHER PUBLICATIONS

IBM Technical Disclosure Bulletin, vol. 24, No. 6, Nov. 1981, "Tool Changer for Robotic Assembly" by Bothun et al.
IBM Technical Disclosure Bulletin, vol. 24, No. 7A, Dec. 1981, "Removable Robotic Devices" by Cummins et al.

Primary Examiner—Johnny D. Cherry
Attorney, Agent, or Firm—Webb, Burden, Robinson & Webb

[57] ABSTRACT

A gripper comprises two supporting coupling members (18) each adapted to be coupled with an exchangeable gripping jaw (20) and clamped together by a coupling plug (26), a transversely displaceable locking member (36) and a spring assembly (60) in the longitudinal direction of the coupling plug (26). The locking member (36) has two opposed surfaces (52,54) for application of external forces by which it is movable into release and locking positions and further includes a wedge surface (40) which cooperates with a limiting surface (32) formed at the coupling plug (26) when the locking member (36) is moved into locking position, tensioning the spring assembly (60). In the operating range of the gripping jaws (20) there is provided a jaw deposit (70) against which both locking members (36) are adapted to be pressed selectively by one each of their two surfaces (52,54) so as to be moved into the release position or into the locking position.

10 Claims, 4 Drawing Figures

GRIPPER INCLUDING AN EXCHANGEABLE GRIPPING JAW

The invention relates to a gripper, especially for automatic handling machines with which at least one supporting coupling member is adapted to be coupled to an exchangeable gripping jaw by means of a coupling comprising a coupling opening and a locking member opening disposed transversely thereof in the supporting coupling member or in the gripping jaw, a coupling plug extending away from the gripping jaw or the supporting coupling member, being insertable in the coupling opening and having a lateral recess, a locking member engaging in the locking member opening and in the recess at the same time when in a locking position, thereby locking the coupling plug in the coupling opening, the gripping jaw, coupling plug, and locking member being clamped together by a spring assembly in the locking position, and the locking member having a surface for application of an external force by which it is movable into a release position at which the coupling plug can be pulled out of the coupling opening.

In a known gripper of this kind (DE No. 33 06 510 A1) the spring assembly is biased in longitudinal direction of the locking member opening, i.e. transversely of the coupling plug and permanently tends to press the locking member into locking position. The gripping jaw cannot adopt a precisely predetermined position with respect to the coupling plug unless the locking member is guided without clearance in the locking member opening of the gripping jaw and in the lateral recess of the coupling plug, a condition which cannot be maintained forever ever in practice. True, the coupling plug is formed with a shoulder-like projection to serve as an abutment for the gripping jaw. Yet the spring assembly can exert only minor force, if any at all, as compared to its bias, in order to urge the gripping jaw in the direction of the projection at the coupling plug. The locking member may be pressed into release position against the resistance of the spring assembly by using a rod-like tool so that the coupling plug may be pulled out of the gripping jaw. When the coupling plug has been reinserted into the coupling opening of the jaw for renewed use thereof, it cannot be determined by the conventional gripper control whether the locking member again has adopted its locking position or perhaps was jammed in its release position. Thus there is a risk that use is made of the gripping jaw without it being locked firmly with the coupling plug.

It is an object of the invention to develop a gripper of the kind defined initially such that its at least one exchangeable gripping jaw can be locked reliably and in accurate positional relationship with the coupling plug and also released from the same by means of a control which is usual for grippers of this kind.

This object is met, in accordance with the invention, in that the spring assembly is adapted to be tensioned in longitudinal direction of the coupling plug, the locking member has a second surface opposite the surface mentioned for application of an external force by which it is movable into the locking position, the locking member further has a wedge surface which cooperates with a limiting surface of the recess formed at the coupling plug to clamp the spring assembly when the locking member is moved into the locking position, and a jaw deposit is arranged within the operating range of the gripping jaw against which deposit the locking member is adapted to be pressed selectively by its first or second surface for application of a force.

In this manner the coupling plug may be inserted into the corresponding gripping jaw without the spring assembly resisting such insertion. It is only when the coupling plug has reached its predetermined end position with respect to the gripping jaw that the locking member is displaced from the release position into the locking position. To this end the gripper may be moved by drive means associated with it anyway in known manner such that the second surface for application of a force in accordance with the invention of the locking member hits the jaw deposit. While the locking member assumes its locking position in this manner, tension builds up in the spring assembly in longitudinal direction of the coupling plug and it keeps the gripping jaw in a position which is determined, for instance, by an abutment face at the supporting coupling member.

The gripper according to the invention is especially well suited for automatic handling machines (robots) and generally comprises two gripping jaws jointly conveying a workpiece from one work station to the next. Furthermore, the gripper according to the invention is suited for conveying tools and for holding workpieces or tools during processing. For instance, the gripper according to the invention may be designed similar to a chuck composed of three jaws, including three gripping jaws for clamping a workpiece at an automatic turning lathe. In all these cases it may be sufficient if one of two or more cooperating gripping jaws is exchangeable in the manner of the invention. In other cases all gripping jaws of the gripper are exchangeable.

The spring assembly preferably is arranged between the supporting coupling member in which the coupling plug is guided for displacement in its longitudinal direction and a head of the coupling plug. Yet it is also possible for the coupling plug to be connected rigidly to the supporting coupling member and the spring assembly to be disposed between the exchangeable gripping jaw and the locking member. Another alternative provides for the coupling plug to be fixed to the exchangeable gripping jaw and the locking member to be guided in the supporting coupling member.

Furthermore, it is convenient to have at least one conical pin fastened to the supporting coupling member or the exchangeable gripping jaw in parallel with the coupling plug, a complementary centering device being associated with the conical pin at the gripping jaw or at the supporting coupling member. In this case the coupling plug may engage in the coupling opening with considerable clearance because it is not responsible for positioning the exchangeable gripping jaw with respect to the supporting coupling member but instead only has to transmit the force of the spring assembly. Other known means, such as complementary serrated surfaces, also known as Hirth gear couplings also may be used for the accurate positioning of the gripping jaw with respect to the supporting coupling member.

It is advantageous if the locking member has a depression in its wedge surface in which depression a foot of the coupling plug may be caught. This will provide positive lock when the locking member is in locking position in which it will thus be held especially reliably against any unintentional displacement.

The gripping jaw may include at least one catch which attempts to hold the locking member in its release position.

Regardless of the above, the gripping jaw may include at least one catch which attempts to hold the locking member in its locking position.

The jaw deposit preferably comprises a latch plate jutting out freely above a setting-down surface and fitting into the locking member opening and adapted to displace the locking member into the release position.

The two measures described above may be developed in common by forming the latch plate with at least one depression in which the catch associated with the locking position of the locking member is adapted to be caught when the locking member has been displaced into the release position.

The jaw deposit may comprise a stop which is disposed opposite the latch plate and against which the locking member is adapted to be pressed by its second surface for application of a force in order to be displaced into locking position.

If the gripper comprises two exchangeable gripping jaws, it is convenient if the jaw deposit comprises a latch plate jutting out freely at two sides and at either side thereof a setting-down surface each for a gripping jaw and a stop each for the second surface for application of a force of the corresponding locking member.

The invention will be described further by way of example, with reference to the accompanying drawings, in which.

Figure 1:
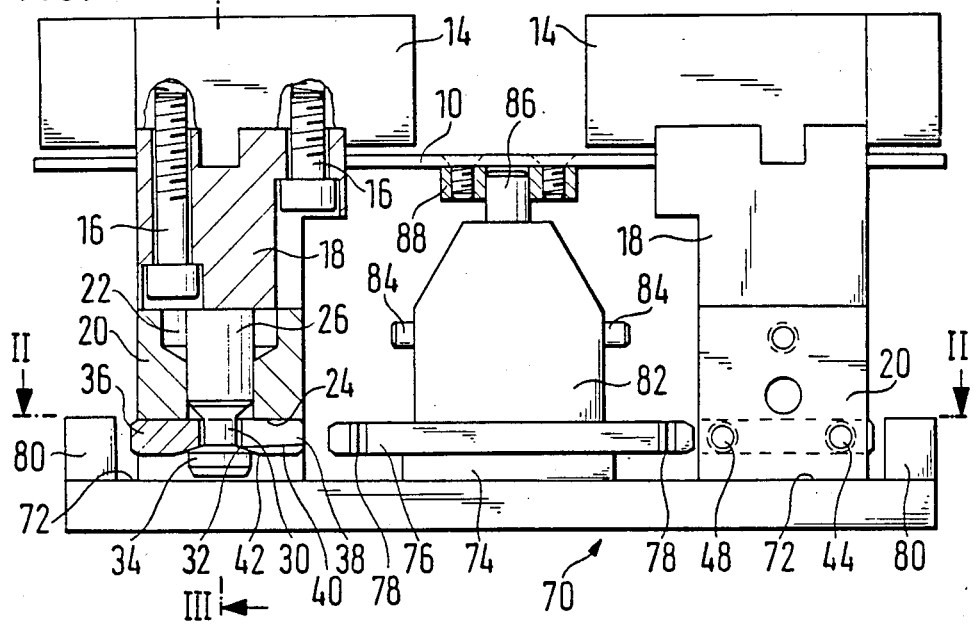
FIG. 1 is a side elevational view of a gripper partly seen in section I—I of FIG. 2.

The gripper shown comprises a casing 10 indicated in part only and having a pair of parallel guides 12 along which two basic jaws 14 are guided to slide. The gripper casing 10 further comprises a drive means of known kind not shown, such as an electric servo motor by means of which the basic jaws are movable in opposite sense by way of a known gear transmission likewise not shown. The gear transmission may consist for example of a threaded spindle having two opposed threads and corresponding nuts. The pitches of the threads either may be same or they may be dissimilar depending on whether the basic jaws 14 are intended to travel equal or unequal distances. A supporting coupling member 18 protruding from the gripper casing 10, in downward direction in the embodiment illustrated, is secured by bolts 16 to each basic jaw 14. The expression "bottom" and "top" as used here and in the specification to follow relates to the presentation in FIGS. 1, 3, and 4. In reality the gripper may assume any desired position in space. An exchangeable gripping jaw 20 each is coupled to each of the two supporting coupling members 18 by means of a coupling to be described in greater detail below.

Figure 3:
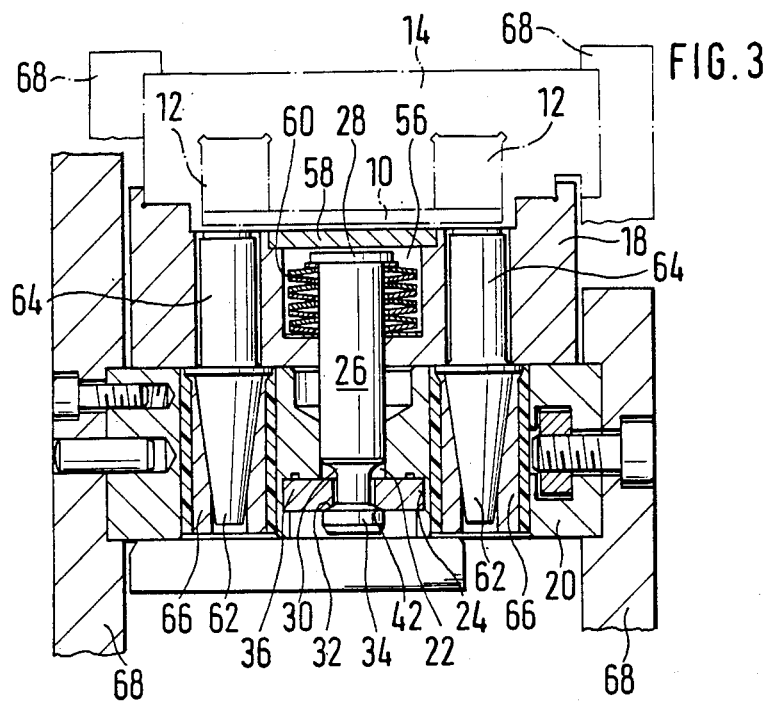
FIG. 3 shows the section III—III of FIG. 1.
Figure 4:
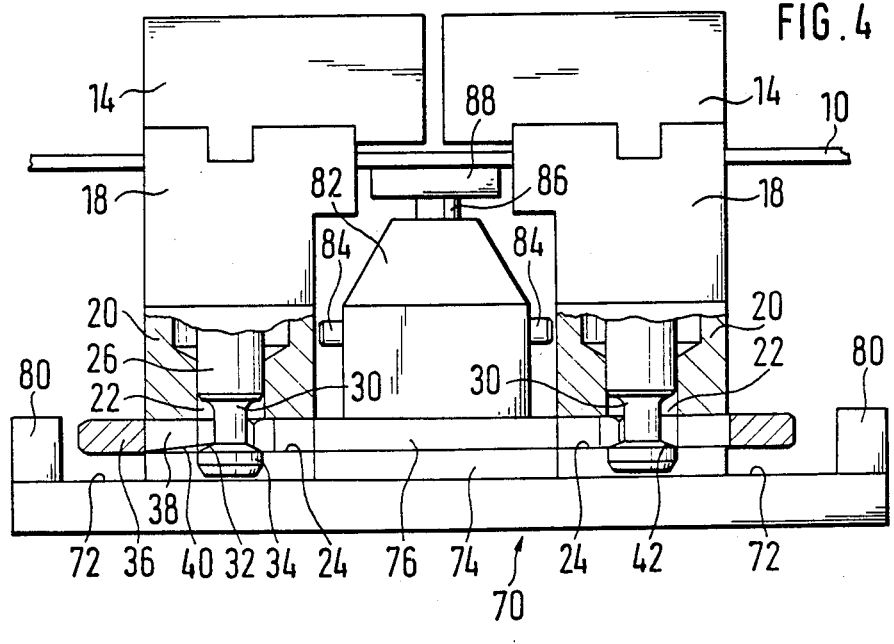
FIG. 4 is a side elevational view similar to FIG. 1 showing the gripper in another operational position.

As shown in FIGS. 1, 3, and 4 each of the two couplings comprises a vertical coupling opening 22 of circular cross section and a locking member opening 24 of rectangular cross section disposed transversely thereof, both openings being formed in the respective gripping jaw 20. A coupling plug 26 embodied by a substantially cylindrical bolt is guided to slide in the coupling opening 22. At its upper end the coupling plug 26 has a head 28 and close to its lower end it is formed with a lateral recess 30 in the form of an annular groove having a conical limiting surface 32 which is followed by a foot 34.

A flat, substantially rectangular locking member 36 is guided in the locking member opening 24 and formed with a slot 38 in one of its narrower sides. In the range of its end the width of the slot 38 is only slightly greater than the diameter of the coupling plug 26 in the area of the recess 30. The slot 38 flares toward the outside where its width is somewhat greater than the diameter of the foot 34. At its lower side the locking member 36 is formed with a wedge surface 40 such that the thickness of the locking member diminishes toward the same narrow side from which the slot 38 starts. A substantially conical depression 42 is formed all around the end of the slot 38 at the lower side of the locking member 36. The foot 34 may become locked in this depression by its upper limiting surface 32.

Figure 2:
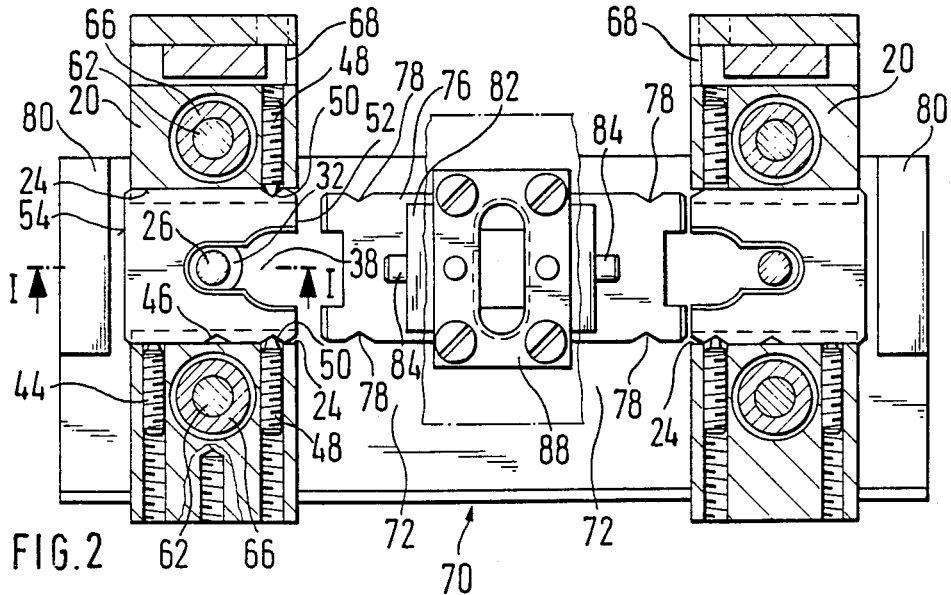
FIG. 2 shows the section II—II of FIG. 1.

FIGS. 1 to 3 show the locking members 36 arranged in the two gripping jaws 20 in a locking position in which they prevent the respective coupling plug 26 from being pulled out of the corresponding gripping jaw 20 in upward direction. FIG. 4 on the other hand shows each of the two locking members 36 in release position at which the associated coupling plug 26 may be pulled out upwardly through the widened portion of the slot 38.

A resilient catch 44 is arranged in each of the two gripping jaws 20 to engage in a notch 46 of the corresponding locking member 36 when the latter is in its release position. Likewise provided in each of the two gripping jaws 20 are two catches 48 which become locked in a notch 50 of the corresponding locking member 36 when the latter assumes its locking position.

Each of the two locking members 36 further includes a surface 52 facing the other locking bar for application of a force in the direction toward the release position as well as a surface 54 remote from the respective other locking member for application of a force acting toward the locking position. In the embodiment shown these surfaces for application of forces are formed by the two end faces of each locking member.

Each of the two supporting coupling members 18 is formed from the top with a cylindrical cavity 56 closed at the top by a screw cap 58. The cavity 56 houses the head 28 and adjacent portion of the corresponding coupling plug 26 as well as the spring assembly 60. In the embodiment shown the spring assembly 60 is formed by a stack of cup springs positioned between the head 28 of the coupling plug 26 and a step formed in the cavity 56. The coupling plug 26 is adapted to be pushed down with respect to the supporting coupling member 18 against the resistance of the spring assembly 60 and it is kept under bias with the respective locking member 36 in locking position whereby the gripping jaw 20 and the coupling member 18 are clamped together.

The coupling plug 26 has sufficient radial clearance with respect to the coupling member 18 and gripping jaw 20 so that it cannot jam. The accurate positioning of each of the two exchangeable gripping jaws 20 with respect to the corresponding coupling member 18 is taken care of by a pair of conical pins 62 each fixed in the respective coupling member 18 by a cylindrical pin 64 with which they are formed and which is retained for instance by a synthetic resin fill-up. Each of the two conical pins 62 engages in a centering device 66 designed as an inwardly conical and outwardly cylindrical sleeve and secured in the respective gripping jaw 20 likewise by a synthetic resin fill-up in the embodiment illustrated.

At least one gripping finger 68 is fixed to each of the two gripping jaws 20 and matches the shape of a workpiece or tool to be manipulated in the usual manner. It is exchangeable together with the associated gripping jaw 20. If an exchangeable arrangement of the gripping fingers 68 is not required, the supporting coupling members 18 may be removed together with the exchangeable gripping jaws 20, while the gripping fingers 68 may be attached directly to the basic jaws 14.

A plurality of preferably stationary jaw deposits 70, one of which is shown, may be provided for exchanging and storing the gripping jaws 20. The jaw deposit shown has two setting-down surfaces 72 for a gripping jaw 20 and a pedestal 74 in between on which a latch plate 76 is fixed such as to jut out from the pedestal above each of the two setting-down surfaces. At each of its two cantilever-type ends the latch plate 76 has a pair of lateral depressions 78. A stop 80 each likewise forming part of the jaw deposit 70 is disposed opposite each of said ends at a spacing which is greater than the length of each of the two locking member 36.

A headpiece 82 is fastened in the center on top of the latch plate 76. From this headpiece two lateral pins 84 project in the same directions as the latch plate 76 and one upper pin 86 projects upwardly from the middle. A centering plate 88 formed with an opening in the center is associated with the upper pin 86 and fastened to the lower side of the gripper casing 10.

When the two gripping jaws 20 are to be exchanged, they are set down on the two setting-down surfaces 72, according to FIGS. 1 to 3, and subsequently moved toward each other by closing movement of the gripper until they each abut against either one of the two lateral pins 84. This causes both ends of the latch plate 76 to enter into the respective locking bar opening 24 and hit against the surface 52 for application of a force of the corresponding locking member 36 which thus is moved out of the locking position shown in FIGS. 1 to 3 into the release position according to FIG. 4. The two catches 48 of each gripping jaw 20 become caught in the two depressions 78 at the corresponding end of the latch plate 76, thereby retaining the gripping jaws against displacement on the jaw deposit 70. Subsequently the gripper casing 10 is moved upwardly together with the basic jaws 14 so that the coupling plug 26 and the conical pins 62 will become detached from the two gripping jaws 20.

If required, the gripper casing 10 is lowered on to another jaw deposit 70 similar to the one shown but carrying gripping jaws 20 with different gripping fingers 68. As soon as the coupling plugs 26 will have entered into the coupling openings 22 of these gripping jaws 20 and, at the same time, the conical pins 62 will have passed into the centering devices 66, they are moved apart by an opening movement of the gripper. At this time the gripping jaws are pushed on the setting-down surfaces 72 away from the latch plate 76 and each of the two locking members 36 hits the respective stop 80 by its surface 54 for application of a force. This will cause the locking members 36 to be moved from their release position into their locking position, their wedge surface 40 each pulling the foot 34 of the respective coupling plug 26 down, thereby tensioning the corresponding spring assembly 60. The gripping jaws 20 thus secured to the supporting coupling members 18 then are moved away from the stops 80 by minor closing movement of the gripper without, however, reaching the latch plate 76. The gripper then may be moved up from this position which is shown in FIGS. 1 to 3 so as to work with the exchanged gripping jaws 20.

What is claimed is:

1. A gripper, especially for automatic handling machines with which at least one male coupling member is adapted to be coupled to a female coupling member by means of a coupling comprising a coupling opening and a locking member opening disposed transversely thereof in said at least one female coupling member, a coupling plug extending away from said at least one male coupling member and being insertable in the coupling opening and having a lateral recess, a locking member engaging in the locking member opening and in the recess at the same time when in a locking position, thereby locking the coupling plug in the coupling opening, the at least one female coupling member, coupling plug, and locking member being clamped together by a spring assembly in the locking position, and the locking member having a surface for application of an external force by which it is movable into a release position at which the coupling plug can be pulled out of the coupling opening, wherein the spring assembly is adapted to be tensioned in longitudinal direction of the coupling plug, the locking member has a second surface opposite the surface mentioned for application of an external force by which it is movable into the locking position, the locking member further has a wedge surface which cooperates with a limiting surface of the recess formed at the coupling plug to clamp the spring assembly when the locking member is moved into the locking position, and a jaw deposit is arranged within the operating range of the gripping jaw against which deposit the locking member is adapted to be pressed selectively by its first or second surface for application of a force.

2. The gripper as claimed in claim 1 wherein said spring assembly is arranged between said male coupling member in which the coupling plug is guided to slide in its longitudinal direction and a head of the coupling plug.

3. The gripper as claimed in claim 1 or claim 2 wherein at least one conical pin is fixed to at least one of said coupling members in parallel with the coupling plug, a centering device being associated with the same at the gripping jaw or at the supporting coupling member complementary with said conical pin being associated with at least another one of said coupling members.

4. The gripper as claimed in claim 1 wherein the locking member has a depression in its wedge surface in which depression a foot of the coupling plug is adapted to be caught in the locking position.

5. The gripper as claimed in claim 1 wherein the gripping jaw includes at least one catch tending to keep the locking member in its release position.

6. The gripper as claimed in claim 1 wherein the gripping jaw includes at least one catch tending to keep the locking member in its locking position.

7. The gripper as claimed in claim 1 wherein the jaw deposit comprises a latch plate jutting out freely above a setting-down surface and fitting into the locking member opening and adapted to displace the locking member into the release position.

8. The gripper as claimed in claim 7 wherein the gripping jaw includes at least one catch tending to keep the locking member in its locking position and the latch plate comprises at least one depression in which the catch associated with the locking position of the locking member is adapted to be caught when the locking member has been displaced into the release position.

9. The gripper as claimed in claim 7 wherein the jaw deposit comprises a stop which is disposed opposite the latch plate and against which the locking member is adapted to be pressed by its second surface for application of a force in order to be displaced into locking position.

10. The gripper as claimed in claim 9, comprising two exchangeable gripping jaws, wherein the jaw deposit comprises a latch plate jutting out freely at two sides and at either side thereof a setting-down surface each for a gripping jaw and a stop each for the second surface for application of a force of the corresponding locking member.

* * * * *